US006962515B2

(12) United States Patent
Dean et al.

(10) Patent No.: US 6,962,515 B2
(45) Date of Patent: Nov. 8, 2005

(54) METHOD OF REDUCING LEAKAGE CURRENT IN ELECTRONIC DEVICES HAVING CARBON NANOTUBES

(75) Inventors: Kenneth A. Dean, Phoenix, AZ (US);
Bernard F. Coll, Fountain Hills, AZ (US); Scott V. Johnson, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 282 days.

(21) Appl. No.: 10/402,114

(22) Filed: Mar. 28, 2003

(65) Prior Publication Data

US 2004/0189174 A1   Sep. 30, 2004

(51) Int. Cl.[7] .................................................. H01J 9/00
(52) U.S. Cl. ........................................ 445/49; 445/50
(58) Field of Search .................... 445/49–51; 313/309, 313/495

(56) References Cited

U.S. PATENT DOCUMENTS 5,719,466 A * 2/1998 Tsai ............................ 313/495

OTHER PUBLICATIONS

Semet et al., "Field Electron Emission from Individual Carbon Nanotubes of a Vertically Aligned Array", Applied Physics Letters, vol. 81, No. 2, Jul. 8, 2002, pp. 343-345.

* cited by examiner

Primary Examiner—Joseph Williams

(57) ABSTRACT

A method of removing, or otherwise rendering non-conductive, unwanted carbon nanotubes (132) from an electronic device (100) includes exposing at least a portion of the device to light emitted by one or more of light sources (202) that emit light. Those regions of the device that have wanted carbon nanotubes formed thereon can be selectively masked, by various methods, from the emitted light.

14 Claims, 1 Drawing Sheet

METHOD OF REDUCING LEAKAGE CURRENT IN ELECTRONIC DEVICES HAVING CARBON NANOTUBES

TECHNICAL FIELD

The present invention relates to electronic devices having carbon nanotubes and, more particularly, to a method of reducing leakage current in these devices by rendering stray carbon nanotubes useless.

BACKGROUND OF THE INVENTION

Field emission display (FED) devices are used to project images onto a surface. A typical FED includes an electron emission source, or cathode, and an anode, which is disposed in spaced-apart relation to the cathode. When a voltage potential of appropriate polarity is applied between the anode and cathode, electrons are emitted from the cathode and are accelerated toward the anode. The anode may be at least partially coated with a fluorescent material. Thus, when the electrons collide with the coated portions of the anode, light is emitted, providing a suitable image. Some FEDs may also include a gate electrode positioned between the cathode and anode. A voltage potential may also be applied to the gate electrode to enhance and/or control the electron flow from the cathode to the anode.

Recently, FEDs began being constructed using carbon nanotubes as the electron emission source, due in part to the low fabrication cost and placement possibilities associated with carbon nanotubes. For example, low cost processes, such as chemical vapor deposition (CVD) and a paste process, are being used to manufacture this type of FED. One drawback associated with these low cost processes is that these techniques can, in many instances, result in residual nanotubes in unwanted areas of the FED. Because carbon nanotubes exhibit relatively high conductivity and may be physically sharp, these residual nanotubes can cause electrical shorts, spurious gate leakage, and spurious anode leakage, all of which may cause image display defects.

Conventionally known cleaning methods are ineffective, and/or degrade FED device field emission properties, and/or are expensive and/or time consuming. For example, one known method used in the display business destroys metal trace lines leading to areas with electrical defects. When applied over a large area, this method is tedious, time-consuming, and involves iteration through electrical testing. Thus, a relatively large yield loss may be experienced by FED device manufacturers.

Hence, there is a need for a method of removing residual nanotubes from unwanted areas of FEDs that does not degrade FED device field emission properties, and/or is not expensive, and/or is not time-consuming. The present invention addresses one or more of these needs.

BRIEF DESCRIPTION OF THE DRAWINGS

The present invention will hereinafter be described in conjunction with the following drawing figures, wherein like numerals denote like elements.

DETAILED DESCRIPTION OF A PREFERRED EMBODIMENT

Figure 1:
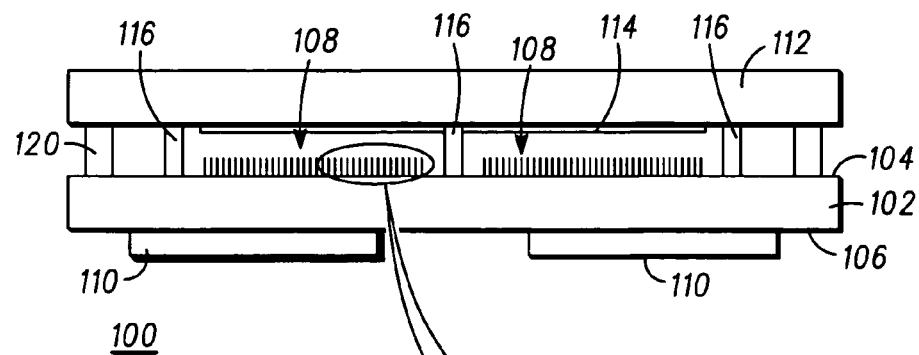
FIG. 1 is a simplified representation of an exemplary field emission display (FED) device showing some exemplary locations of unwanted carbon nanotubes following FED device manufacture.

A simplified representation of an exemplary field emission display (FED) device 100 that uses carbon nanotube field emitters is illustrated in FIG. 1. The FED 100 includes a substrate 102 having at least a first surface 104 and a second surface 106. A plurality of field emission devices 108 are formed on the substrate first surface 104, and one or more device drive electronic circuits 110 are coupled to, or formed on, the substrate second surface 106. The device drive electronic circuits 110 are used to drive the emission devices 108.

A viewing window 112, which is preferably made of glass, is coated with, for example, a fluorescent material 114. A plurality of spacers 116 are disposes between the substrate 102 and the viewing window 112, defining a space 118 between the substrate 102 and viewing window 112. The substrate 102 and viewing window 112 are coupled together via a vacuum glass seal 120. Though not depicted in FIG. 1, it will be appreciated that a conductive electrode is formed on the surface of the viewing window 112, and acts as the device anode during device operation.

Figure 2:
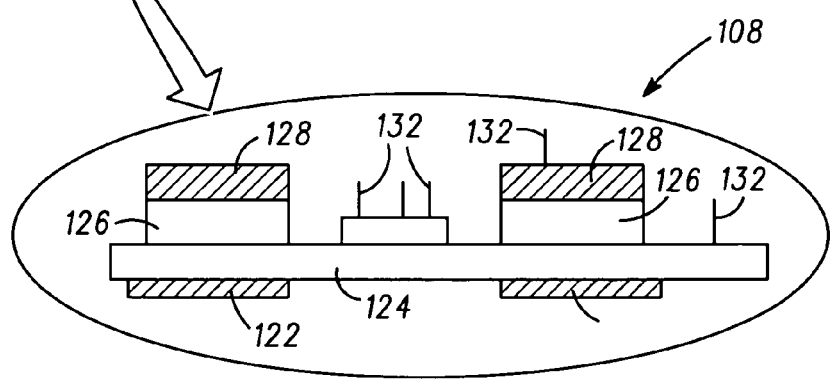
FIG. 2 is a simplified representation of an exemplary system configuration for removing unwanted carbon nanotubes from the FED device of FIG. 1.

One region of the FED is shown in enlarged form in FIG. 2, and depicts, in simplified form, the basic structure of one of the field emission devices 108 that may be formed on the substrate first surface 104. In the depicted embodiment, the field emission device 108 is made by depositing a conductive layer 122 on the substrate 102 using any one of numerous known deposition techniques. A resistive layer 124 and a dielectric layer 126, such as silicon dioxide ($SiO_2$), are then deposited, in turn, on top of the conductive layer 122. A gate electrode 128 is then deposited onto the dielectric layer 126.

An emitter well 130 is formed by selectively etching through the gate electrode 128 and the dielectric layer 126. Electron emissive carbon nanotubes 132 are then formed on the resistive layer 124 using, for example, a screen-printing process, a paste process, or a catalytic growth process. In each case, the nanotubes are disposed on an opaque binding layer (not explicitly shown in FIG. 1). As FIG. 1 additionally shows, the processes for forming the carbon nanotubes 132 results in carbon nanotubes 132 being formed not only in the emitter well 130, but in unwanted regions of the FED 100 as well, such as, for example, on the gate electrode 128 and on the resistive layer 124 outside the specified region. As was noted previously, the carbon nanotubes 132 that are errantly formed can cause, among other things, spurious leakage currents, which can cause image display defects.

Figure 3:
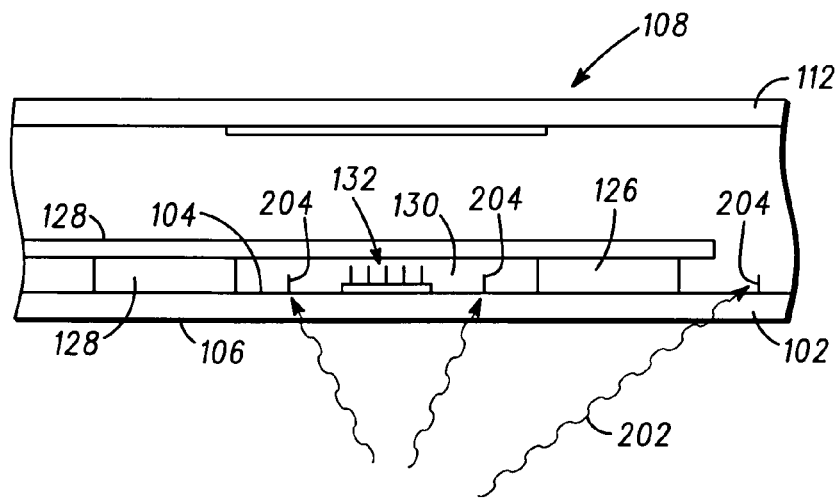
FIG. 3 is a simplified representation of another exemplary system configuration for removing unwanted carbon nanotubes from the FED device of FIG. 1.
Figure 4:
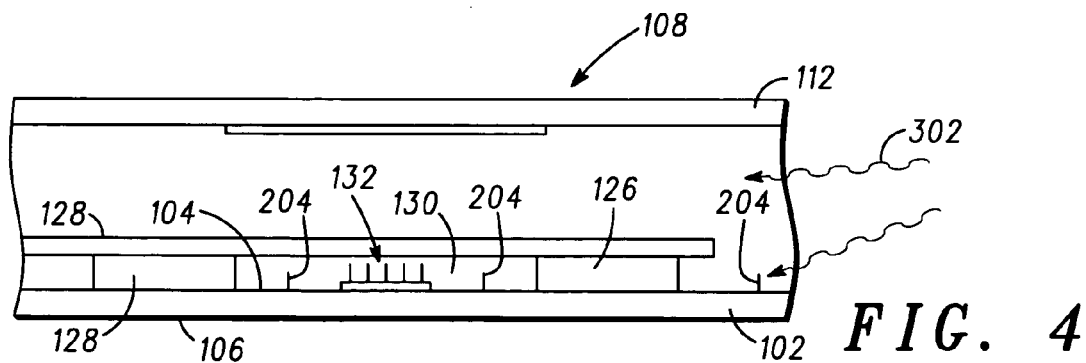
FIG. 4 is a simplified representation of another exemplary system configuration for removing unwanted carbon nanotubes from the FED device of FIG. 1.

Turning now to FIGS. 3 and 4, an exemplary method for removing, or otherwise rendering non-conductive, errantly formed carbon nanotubes 132 from an electronic device, such as a field emission device 108, will be described. It is understood that electrical defects in the device caused by errantly formed nanotubes can be eliminated either by removing unwanted carbon nanotubes or by rendering them non-conductive. As FIGS. 3 and 4 illustrate, exposing the device 108 to bright light from a light source, at various orientations and/or configurations, will destroy unwanted carbon nanotubes 132. The light source 202 may be any one of numerous known devices for emitting light at intensities and wavelengths that are sufficient to destroy carbon nanotubes in various ambient environments. Non-limiting examples of a suitable light source include a flashlamp and a broad area high power laser. In a preferred embodiment, however, the light source is a flashlamp.

As shown specifically in FIG. 3, it is seen that unwanted carbon nanotubes 204 both in, and around the periphery of, the emitter well 130 can be removed by flashing light from the light source 202 through the second surface 106 of the substrate 102. If desired, selected areas of the device 108 that include wanted carbon nanotubes 132, and which should not be destroyed, can be masked if so desired. Preferably, if a mask is used, a light blocking shadowmask, or equivalent, is used to selectively mask those regions of the device 108 to which exposure to the light from the light source 202 is not wanted. Unwanted carbon nanotubes 204 can also be selectively removed by varying the relative orientation of the device 108 and the light source 202. For example, as shown in FIG. 4, by orienting the light source 202 at an angle incident to the substrate first surface 104, unwanted nanotubes 204 on the substrate first surface 104 can be removed, while the nanotubes 132, 204 within the well region 130 remain intact.

In addition to selectively removing unwanted carbon nanotubes 204 by masking and relative orientation variation, unwanted carbon nanotubes 204 may be selectively removed by exposing the device 108, or portions of the device 108, to light of varying wavelengths and/or intensities. In addition to selective removal, unwanted carbon nanotubes 204 may be selectively transformed into a substantially non-conductive state. Such transformations may be implemented by varying the ambient conditions during exposure to the light. For example, if the device 108, or portion thereof, is placed in a substantially oxidizing environment, such as one that is substantially made up of air, oxygen, or various other oxidizing agents, and then the unwanted carbon nanotubes in the environment are exposed to the light emitted from the light source 202, the carbon nanotubes will burn, turning each into $CO_2$ gas. Alternatively, if the device 108, or portion thereof, is placed in a substantially reactive environment, such as one that is substantially made up of fluorine, chlorine, or other similar reactive gas, and then the unwanted carbon nanotubes in the environment are exposed to the light emitted from the light source 202, the unwanted carbon nanotubes, or at least the outer most surfaces thereof, will transform into a non-conductive material. For example, in the case of fluorine the unwanted carbon nanotubes would transform into a non-conductive fluorocarbon material. Moreover, placing the device 108, or portion thereof, in a reducing environment will cause the unwanted carbon nanotubes to transform into, for example, a methane gas upon exposure thereof to the light emitted from the light source 202.

Selective removal and/or transformation to an otherwise non-conductive state may also be accomplished by the above described methods and by additionally applying different electrical fields. For example, exposing the device 108, or portions thereof, to light in an environment of 100% oxygen and applying a 5 volt/micron electric field will render the unwanted carbon nanotubes 204 useless with particular efficiency in the high field region.

The method described herein provides an effective, relatively inexpensive, and relatively quick method of removing, or otherwise rendering non-conductive, unwanted carbon nanotubes from electronic devices, such as FEDs. Although the method was described as being implemented for FEDs, it will be appreciated that the method is useful for various nanotube-based electronic devices, non-limiting examples of which include bio-sensors, X-ray sources, field effect devices, and radio frequency (RF) tubes.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In an electronic device having one or more unwanted carbon nanotubes, method of rendering the unwanted carbon nanotubes non-conductive, the method comprising:
    providing one or more light sources that emit light; and
    exposing at least a portion of the device to the light emitted by one or more of the light sources,
    wherein the unwanted carbon nanotubes that are exposed to the light are rendered non-conductive.

2. The method of claim 1, further comprising:
    selectively masking one or more areas of the device that have carbon nanotubes thereon and which exposure to light from the light sources is unwanted.

3. The method of claim 1, wherein the light sources each comprise a flashlamp.

4. The method of claim 1, wherein the light sources are each operable to emit light at various intensities and various wavelengths.

5. The method of claim 1, further comprising:
    varying a relative orientation of one or more of the light sources and the device being exposed, to thereby selectively render unwanted carbon nanotubes non-conductive.

6. The method of claim 1, further comprising:
    placing at least a portion of the device that includes one or more of the unwanted carbon nanotubes in an environment that includes one or more oxidizing agents,
    wherein the unwanted carbon nanotubes are rendered non-conductive by being combusted.

7. The method of claim 1, further comprising:
    placing at least a portion of the device that includes one or more of the unwanted carbon nanotubes in an environment that includes one or more reactive agents,
    wherein the unwanted carbon nanotubes are rendered non-conductive by at least a portion of each unwanted carbon nanotube being transformed into a non-conductive material.

8. A method of reducing leakage currents in a field emission display device, comprising:
    fabricating at least a portion of the field emission display device, the field emission display device having a plurality of carbon nanotubes; and
    exposing at least a portion of the field emission display device to light,
    wherein at least a portion of the carbon nanotubes that are exposed to the light are rendered non-conductive.

9. The method of claim 8, further comprising:

selectively masking one or more areas of the device that have carbon nanotubes thereon and which exposure to the carbon nanotube destroying light is unwanted.

10. The method of claim 8, wherein the light is emitted from a flashlamp.

11. The method of claim 8, wherein the light is emitted at various intensities and various wavelengths.

12. The method of claim 8, further comprising:
varying a relative orientation of the light and the device being exposed to thereby selectively render unwanted carbon nanotubes non-conductive.

13. The method of claim 8, further comprising:
placing at least a portion of the device that includes one or more unwanted carbon nanotubes in an environment that includes one or more oxidizing agents,
wherein the unwanted carbon nanotubes are rendered non-conductive by being combusted.

14. The method of claim 8, further comprising:
placing at least a portion of the device that includes one or more unwanted carbon nanotubes in an environment that includes one or more reactive agents,
wherein the unwanted carbon nanotubes are rendered non-conductive by at least a portion of each unwanted carbon nanotube being transformed into a non-conductive material.

* * * * *